United States Patent [19]
Murakami et al.

[11] 3,946,622
[45] Mar. 30, 1976

[54] SPEED CHANGE GEAR
[75] Inventors: Noboru Murakami, Nagoya; Koichiro Hirosawa, Kariya; Kazuo Ohara; Koichi Matsuo, both of Toyota, all of Japan
[73] Assignee: Aisin Seiki Kabushiki Kaisha, Aichi, Japan
[22] Filed: Feb. 7, 1974
[21] Appl. No.: 440,545

[30] Foreign Application Priority Data
Feb. 26, 1973 Japan.............................. 48-22832
Apr. 28, 1973 Japan.............................. 48-48901

[52] U.S. Cl.................................... 74/765; 74/764
[51] Int. Cl.².......................................... F16H 57/10
[58] Field of Search............ 74/764, 765, 768, 769, 74/753

[56] References Cited
UNITED STATES PATENTS
| | | | |
|---|---|---|---|
| 3,383,954 | 5/1968 | McFarland | 74/753 |
| 3,386,314 | 6/1968 | Stockton | 74/765 |
| 3,678,783 | 7/1972 | O'Malley et al. | 74/765 |
| 3,835,732 | 9/1974 | Mori et al. | 74/765 |

Primary Examiner—Samuel Scott
Assistant Examiner—P. S. Lall
Attorney, Agent, or Firm—Oblon, Fisher, Spivak, McClelland & Maier

[57] ABSTRACT

Speed change gears of the planetary gear type suited for applications within fluid couplings used upon automotive vehicles includes an input shaft, a first clutch for releasing or coupling a second ring gear and a third sun gear simultaneously from or to the input shaft, a second clutch for releasing or coupling a first sun gear and a second sun gear simultaneously from or to the input shaft, a first planetary gear engaged with the first sun gear, a first ring gear engaging the first planetary gear, a first carrier rotatably supporting the first planetary gear, a second planetary gear engaged with the second sun gear and the second ring gear, a second carrier rotatably supporting the second planetary gear, a third planetary gear enmeshed with the third sun gear, a third ring gear interengaged with the third planetary gear and coupled to the first ring gear, a third carrier rotatably supporting the third planetary gear and coupled to the second carrier and to an output shaft, a first brake capable of locking the first sun gear and the second sun gear simultaneously to a casing, a second brake capable of locking the first carrier relative to the casing, and a third brake capable of locking the first ring gear and the third ring gear simultaneously to the casing.

1 Claim, 9 Drawing Figures

SPEED CHANGE GEAR

BACKGROUND OF THE INVENTION

1. Field of the Invention

The present invention relates generally to speed change gears and more particularly to speed change gears suited for applications with fluid couplings or torque converters used upon vehicles, especially automobiles.

2. Description of the Prior Art

It is desirable that the gear type speed changer of automatic transmissions used upon large automotive vehicles, such as for example, trucks and buses should be capable of shifting between at least four forward speeds and operating with one reverse speed. This speed changing mechanism may be realized by suitably combining three, four or even more simple sets of planetary gears of the single pinion or the double pinion type, of which a variety of combinations may be considered. Within any combination of such planetary gear sets, the following conditions are desired to be satisfied:

1. The output shaft should be coupled to the same elements within each speed range.
2. In order to reduce the circumferential speed of the bearing of each element of the planetary gear set, the number of its revolutions should be small.
3. The tooth load, that is, the tangential force, of each element should be small so as to maintain the strength of the gear teeth.
4. The gear set should meet the meshing conditions for the number of teeth. The sun whose diameter is minimized, as well as each planetary pinion gear, should have the necessary number of teeth.
5. Within each planetary gear set, the coupling relationship among the elements should be simple and the distance from each other be short.
6. When attaining speed shifts by frictional coupling means during forward drive, such speed shifts should be available through one coupling means alone.

Conventional apparatus failed to efficiently attain these conditions.

SUMMARY OF THE INVENTION

Accordingly, the principal object of the present invention is the provision of an efficient speed change gear mechanism of the planetary gear type which is able to provide at least four forward speeds and one reverse speed.

The foregoing object and other objectives are achieved according to this invention through the provision of a speed change gear mechanism employing three simple planetary gear sets of the single pinion type, two clutch units, and three brake units. The movable members of the three planetary gear sets are suitably coupled to each other, and the clutch units and brake units are suitably coupled, uncoupled, locked and unlocked.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
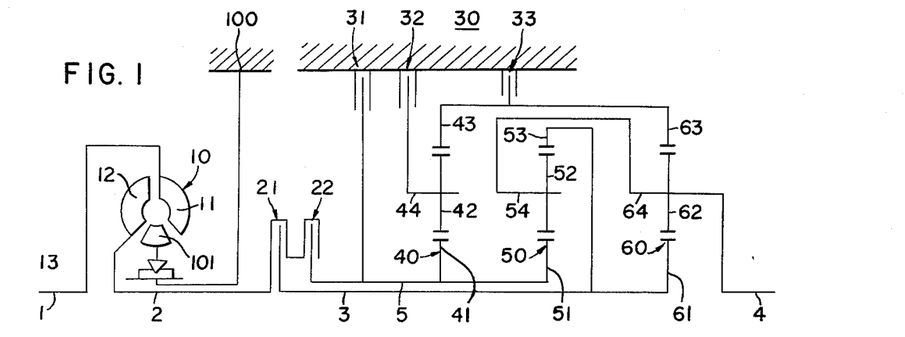
FIG. 1 is a view schematically illustrating a first embodiment of a speed change gear constructed according to the present invention and showing its cooperative parts.

Referring now to the drawings and more particularly to FIG. 1 thereof, there is schematically shown a first embodiment of the present invention wherein a generally known three-element one-stage two-phase torque converter, generally indicated by the reference character 10 includes a pump impeller 11 connected to an input shaft 1, a turbine runner 12 connected to a first intermediate shaft 2, and a stator wheel 13 supported by means of a casing 100 through means of a one-way brake 101. A first clutch 21 is interposed between the first intermediate shaft 2 and a second intermediate shaft 3 disposed serially and coaxially with the first intermediate shaft 2, the first clutch 21 of course serving to couple the intermediate shafts together or uncouple them from each other, and a hollow, third intermediate shaft 5 is also disposed upon the second intermediate shaft 3 in coaxial fashion.

A first sun gear 41 and a second sun gear 51 of a first planetary gear set, generally indicated by the reference character 40, and of a second planetary gear set, generally indicated by the reference character 50, respectively, are secured upon the third intermediate shaft 5 by spline means or the like so as to allow the sun gears 41 and 51 to rotate with the third intermediate shaft 5. A second clutch 22 is similarly interposed between the third intermediate shaft 5 and the first intermediate shaft 2 so as to couple these shafts together or uncouple them from each other. Furthermore, a first brake 31 is interposed between the third intermediate shaft 5 and the casing 100, and when this brake is actuated, the third intermediate shaft 5 as well as the first and second sun gears 41 and 51 are locked relative to casing 100.

The first planetary gear set 40 is seen to comprise the first sun gear 41, a first planetary gear 42 engaged with the first sun gear 41, a first ring gear 43 enmeshed with the first planetary gear 42, and a first carrier 44 rotatably supporting the first planetary gear 42. A second brake 32 is interposed between the first carrier 44 and the casing 100, and when this brake is actuated, the first carrier 44 is locked relative to casing 100.

The second planetary gear set 50 similarly comprises the second sun gear 51, a second planetary gear 52 interengaged with the second sun gear 51, a second ring gear 53 engaged with the second planetary gear 52, and drivingly coupled to the second intermediate shaft 3, and a second carrier 54 rotatably supporting the second planetary gear 52.

A third sun gear 61 of a third planetary gear set, generally indicated by the reference character 60, is also secured upon the second intermediate shaft 3 by spline means or the like whereby the sun gear 61 is able to rotate with the second intermediate shaft 3, and the third planetary gear set 60 further comprises a third planetary gear 62 engaged with the third sun gear 61, a third ring gear 63 interengaged with the third planetary gear 62 and drivingly coupled to the first ring gear 43, and a third carrier 64 rotatably supporting the third planetary gear 62 and drivingly coupled to the second carrier 54 as well as to an output shaft 4 coaxially and serially disposed with respect to the second intermediate shaft 3. A third brake 33 is interposed between the casing 100 and the two ring gears 43 and 63 and when this brake is actuated, the ring gears 43 and 63 are locked relative to casing 100.

Within each of the simple, single pinion type planetary gear sets, the following conditions prevail:

$$N_{Rn} - (1 + I_n) N_{Cn} = 0 \ (n + 1, 2, 3, \ldots)$$

wherein:
$N_{Rn}$ = the number of revolutions of the ring gear
$N_{Cn}$ = the number of revolutions of the carrier
$N_{Sn}$ = the number of revolutions of the sun gear
$I_n$ = the radial ratio between the ring gear and the sun gear More specifically, the radial ratios within the speed change gear mechanism of the present invention are, for example, $I_1 = 0.28$, $I_2 = 0.52$ and $I_3 = 0.36$. The following table summarizes the gear ratios in connection with the operation of clutches 21 and 22, and brakes 31, 32 and 33:

invention, friction wheels may readily be used in place of the noted gears in order to constitute the foregoing speed change mechanism.

Table 1 shows the relationship between the number of revolutions and the tangential force of each of the elements of the planetary gear sets within the individual speed ranges, the ratio of the number of revolutions being based upon the assumption that the number of revolutions of the input shaft is 1, and the tangential force upon the assumption that the input shaft torque exerted upon the ring gear is 1, and these assumptions apply throughout the other embodiments hereinafter described. Within the Tables, the symbols utilized have the following designations:

A = the speed ranges
B = the planetary gear sets
N = the number of revolutions
W = the tangential force
$X_n$ = the n-th planetary gear set
$S_n$ = the n-th sun gear
$P_n$ = the n-th planetary gear
$RG_n$ = the n-th ring gear
$Cn$ = the n-th carrier

TABLE 1

| A | B | X1 | | | | X2 | | | | X3 | | | |
|---|---|-----|------|------|------|------|------|------|------|------|------|------|------|
|   |   | S1  | C1   | RG1  | P1   | S2   | C2   | RG2  | P2   | S3   | C2   | RG3  | P3   |
| F1 | N | −1.15 | −0.25 | 0.0 | 0.70 | −1.15 | 0.26 | 1.00 | 3.06 | 1.00 | 0.26 | 0.0 | −0.83 |
|    | W | 0.0 | 0.0 | 0.0 | 0.0 | 0.0 | 0.00 | 0.00 | 0.00 | 2.78 | 5.56 | 2.78 | 2.78 |
| F2 | N | −0.72 | −0.00 | 0.20 | 0.56 | −0.72 | 0.41 | 1.00 | 2.45 | 1.00 | 0.41 | 0.20 | −0.66 |
|    | W | 1.11 | 2.23 | 1.11 | 1.11 | 0.60 | 1.20 | 0.60 | 0.60 | 1.11 | 2.23 | 1.11 | 1.11 |
| F3 | N | 0.0 | 0.42 | 0.53 | 0.32 | 0.0 | 0.66 | 1.00 | 1.43 | 1.00 | 0.66 | 0.53 | −0.38 |
|    | W | 0.0 | 0.0 | 0.0 | 0.0 | 1.00 | 2.00 | 1.00 | 1.00 | 0.00 | 0.0 | 0.0 | 0.0 |
| R1 | N | 1.00 | 0.22 | 0.0 | 0.61 | 1.00 | −0.23 | −0.87 | −2.67 | −0.87 | −0.23 | 0.00 | 0.72 |
|    | W | 0.0 | 0.0 | 0.0 | 0.0 | 1.92 | 3.85 | 1.92 | 1.92 | 5.34 | 10.68 | 5.34 | 5.34 |
| R2 | N | 1.00 | 0.00 | −0.28 | −0.78 | 1.00 | −0.57 | −1.39 | −3.41 | −1.3 | −0.57 | −0.28 | 0.92 |
|    | W | 2.14 | 4.28 | 2.14 | 2.14 | 0.77 | 1.54 | 0.77 | 0.77 | 2.14 | 4.28 | 2.14 | 2.14 |

Because the gear ratio at the fourth forward speed is 1 : 1.00, the number of revolutions of each planetary gear is 0.00 when the number of revolutions of each sun gear, ring gear and carrier is 1.00. The tangential force is much smaller within the fourth forward speed range than in the other speed ranges due to the fact that within the fourth forward speed range, the torque of the input shaft is distributed to the individual elements through the coupling of at least two clutches, while in the other speed ranges, the torque of the input shaft is imparted to the individual elements through coupling of only one of the clutches. Hence, for the fourth speed range wherein the gear ratio is 1.00, the number of revolutions and the tangential force are not shown in Table 1. Similar conditions prevail for the other embodiments of the present invention as will be described hereinafter.

| Speed Ranges | 21 | 22 | 31 | 32 | 33 | Gear Ratios |
|---|---|---|---|---|---|---|
| first speed | O | | | | O | 1 : 3.778 |
| second speed | O | | | O | | 1 : 2.425 |
| third speed | O | | O | | | 1 : 1.520 |
| fourth speed | O | O | | | | 1 : 1.000 |
| reverse 1st speed | | O | | | | 1 : −4.342 |
| reverse 2nd speed | | O | | | | 1 : −1.741 |

Figure 2:
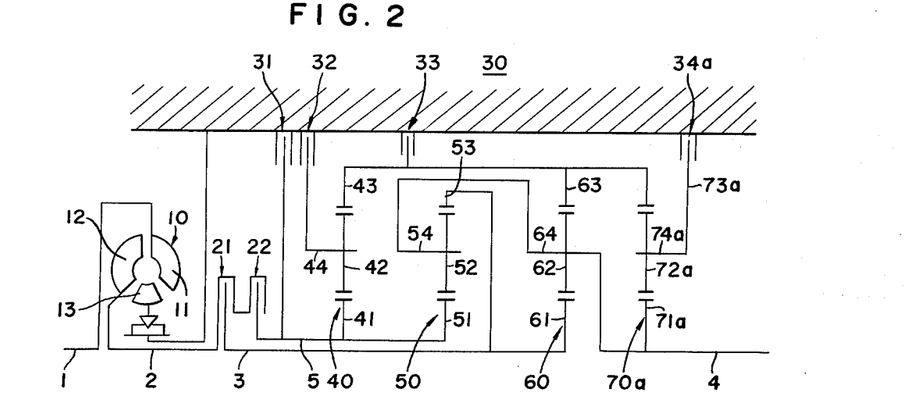
FIG. 2 is a view similar to that of FIG. 1 illustrating however a second embodiment of the present invention.

As described above, the present invention thus makes it feasible to realize gear ratios for four forward speeds and two reverse speeds by the utilization of three simple planetary gear sets of the single pinion type and according to a further aspect of the present Referring now to FIG. 2, there is schematically shown a second embodiment of the present invention which is similar to the first embodiment and wherein there is further included a fourth sun gear 71a of a fourth planetary gear set, generally indicated by the reference character 70a, of the single pinion type, secured upon the output shaft 4 by spline means or the like whereby the sun gear is able to rotate with the output shaft 4. The fourth planetary gear set 70a further includes a fourth planetary gear 72a engaged with the sun gear 71a, a fourth ring gear 73a interengaged with the fourth planetary gear 72a and integrally coupled to the third ring gear 63 and a fourth carrier 74a rotatably supporting the fourth planetary gear 72a. Since ring gear 73a is coupled to ring gear 63a, gears 73a is locked relative to casing 30 when the third brake 33 is actuated. A fourth brake 34a is similarly interposed between the fourth carrier 74a and the casing 30, and when this brake is actuated, the fourth carrier 74a is locked relative thereto.

Figure 3:
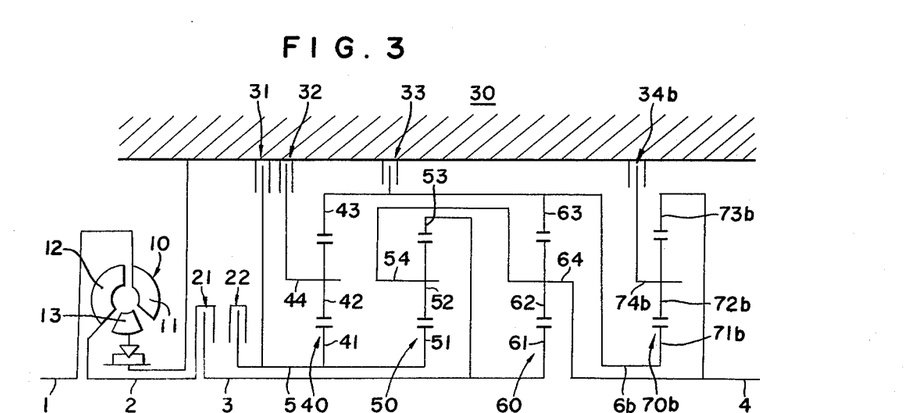
FIG. 3 is a view similar to that of FIG. 1 illustrating however a third embodiment of the invention.

Within this embodiment, the radial ratios are: $I_1 = 0.280$, $I_2 = 0.520$, $I_3 = 0.360$, and $I_4 = 0.562$, and the gear ratios within the individual speed ranges, five forward speed ranges and three reverse speed ranges in connection with the operations of clutches 21 and 22 and brakes 31, 32, 33 and 34a are summarized in the following table:

which is also similar to the first embodiment and wherein there is included a hollow third intermediate shaft 6b coaxially disposed upon the output shaft 4, and a fourth sun gear 71b of a fourth planetary gear set generally indicated by the reference character 70b, of the single pinion type, is secured upon the third intermediate shaft 6b by spline means or the like whereby the sun gear 71b is able to rotate with the third intermediate shaft 6b. The fourth planetary gear set 70b further has a fourth planetary gear 72b engaged with the fourth sun gear 71b, a fourth ring gear 73b enmeshed with the fourth planetary gear 72b and integrally coupled to the output shaft 4, and a fourth carrier 74b rotatably supporting the fourth planetary gear 72b. The third intermediate shaft 6b is integrally coupled to the third ring gear 63 and consequently, this intermediate shaft is locked relative to casing 30 when the third brake 33 is actuated. A fourth brake 34b is similarly installed between the fourth carrier 74b and the casing 30 and when this brake is actuated, the fourth carrier 74b is locked relative to casing 30.

TABLE 2

| A | B | X1 | | | | | X2 | | |
|---|---|---|---|---|---|---|---|---|---|
|   |   | S1 | C1 | RG1 | P1 | S2 | C2 | RG2 | P2 |
| F1 | N | −1.38 | −0.38 | −0.11 | 0.77 | −1.38 | 0.19 | 1.00 | 3.39 |
|    | W | 0.0 | 0.0 | 0.0 | 0.0 | 0.0 | 0.00 | 0.00 | 0.00 |
| F2 | N | −1.15 | −0.25 | 0.0 | 0.70 | −1.15 | 0.26 | 1.00 | 3.06 |
|    | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
|    | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
|    | W | 0.0 | 0.0 | 0.0 | 0.0 | 1.00 | 2.00 | 1.00 | 1.00 |
| R1 | N | 1.00 | 0.28 | 0.08 | −0.56 | 1.00 | −0.14 | −0.78 | −2.46 |
|    | W | 0.0 | 0.0 | 0.0 | 0.0 | 1.92 | 3.85 | 1.92 | 1.92 |
| R2 | N | 1.00 | 0.22 | 0.0 | −0.61 | 1.00 | −0.23 | −0.87 | −2.67 |
|    | W | 0.0 | 0.0 | 0.0 | 0.0 | 1.92 | 3.85 | 1.92 | 1.92 |
| R3 | N | 1.00 | 0.00 | −0.28 | −0.78 | 1.00 | −0.57 | −1.39 | −3.41 |
|    | W | 2.14 | 4.28 | 2.14 | 2.14 | 0.77 | 1.54 | 0.77 | 0.77 |

| A | B | X3 | | | | X4 | | | |
|---|---|---|---|---|---|---|---|---|---|
|   |   | S3 | C2 | RG3 | P3 | S4 | C4 | RG4 | P4 |
| F1 | N | 1.00 | 0.19 | −0.11 | −0.91 | 0.19 | 0.00 | −0.11 | −0.48 |
|    | W | 2.78 | 5.56 | 2.78 | 2.78 | 2.78 | 5.56 | 2.78 | 2.78 |
| F2 | N | 1.00 | 0.26 | 0.0 | −0.83 | 0.26 | 0.10 | 0.0 | −0.43 |
|    | W | 2.78 | 5.56 | 2.78 | 2.78 | 0.0 | 0.0 | 0.0 | 0.0 |
| F3 | N | 1.00 | 0.41 | 0.20 | −0.66 | 0.41 | 0.28 | 0.20 | −0.35 |
|    | W | 1.11 | 2.23 | 1.11 | 1.11 | 0.0 | 0.0 | 0.0 | 0.0 |
| F4 | N | 1.00 | 0.66 | 0.53 | −0.38 | 0.66 | 0.58 | 0.53 | −0.20 |
|    | W | 0.00 | 0.0 | 0.0 | 0.0 | 0.0 | 0.0 | 0.0 | 0.0 |
| R1 | N | −0.73 | −0.14 | 0.08 | 0.66 | −0.14 | 0.0 | 0.08 | 0.35 |
|    | W | 5.34 | 10.68 | 5.34 | 5.34 | 5.34 | 10.68 | 5.34 | 5.34 |
| R2 | N | −0.87 | −0.23 | 0.0 | 0.72 | −0.23 | −0.08 | 0.0 | 0.38 |
|    | W | 5.34 | 10.68 | 5.34 | 5.34 | 0.0 | 0.0 | 0.0 | 0.0 |
| R3 | N | −1.39 | −0.57 | −0.28 | 0.92 | −0.57 | −0.39 | −0.28 | 0.48 |
|    | W | 2.14 | 4.28 | 2.14 | 2.14 | 0.0 | 0.0 | 0.0 | 0.0 |

| Speed Ranges | 21 | 22 | 31 | 32 | 33 | 34a | Gear Ratios |
|---|---|---|---|---|---|---|---|
| first speed | O | | | | | O | 1 : 5.34 |
| second speed | O | | | | O | | 1 : 3.78 |
| third speed | O | | | O | | | 1 : 2.43 |
| fourth speed | O | | O | | | | 1 : 1.52 |
| fifth speed | O | O | | | | | 1 : 1.00 |
| reverse 1st speed | | O | | | | O | 1 : −7.34 |
| reverse 2nd speed | | O | | | O | | 1 : −4.34 |
| reverse 3rd speed | | O | O | | | | 1 : −1.74 |

Table 2 shows the relationship between the number of revolutions and the tangential force of each of the elements of the planetary gear sets within each speed range.

Referring now to FIG. 3, there is schematically shown a third embodiment of the present invention In this embodiment, the radial ratios are: $I_1 = 0.280$, $I_2 = 0.520$, $I_3 = 0.360$ and $I_4 = 0.562$ and the gear ratios within the individual speed ranges, five forward speed ranges and three reverse speed ranges, in connection with the operations of clutches 21 and 22, and brakes 31, 32, 33 and 34b are summarized in the following table:

| Speed Ranges | 21 | 22 | 31 | 32 | 33 | 34b | Gear Ratios |
|---|---|---|---|---|---|---|---|
| first speed | O | | | | | O | 1 : 8.72 |
| second speed | O | | | | O | | 1 : 3.78 |
| third speed | O | | | O | | | 1 : 2.43 |
| fourth speed | O | | O | | | | 1 : 1.52 |
| fifth speed | O | O | | | | | 1 : 1.00 |
| reverse 1st speed | | O | | | | O | 1 : −13.85 |
| reverse 2nd speed | | O | | | O | | 1 : −4.34 |
| reverse 3rd speed | | O | | O | | | 1 : −1.74 |

Table 3 also shows the relationship between the number of revolutions and the tangential force of the elements of the planetary gear sets within each speed range.

Figure 4:
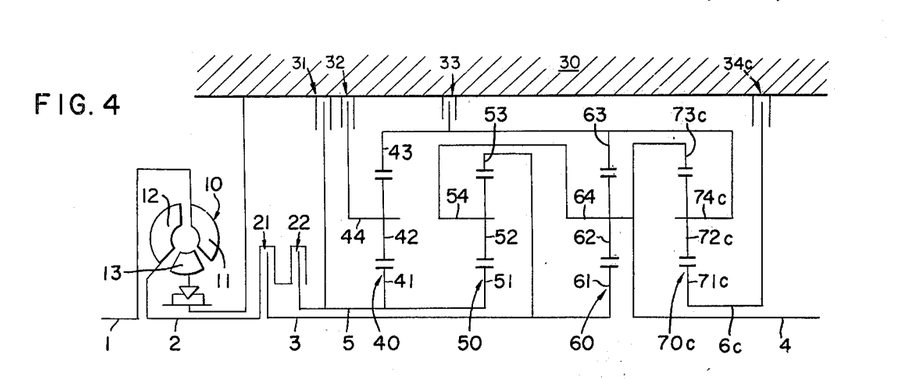
FIG. 4 is a view similar to that of FIG. 1 illustrating however, a fourth embodiment of the present invention.

Turning now to FIG. 4, a fourth embodiment of the present invention is seen to be quite similar to the first embodiment, although the present embodiment includes a hollow third intermediate shaft 6c disposed coaxially upon the output shaft 4 and a fourth sun gear 71c of a fourth planetary gear set, generally indicated by the reference character 70c, of the single pinion type, is secured upon the third intermediate shaft 6c by spline means or the like so as to allow sun gear 71c to rotate with the third intermediate shaft 6c. The fourth planetary gear set 70c further includes a fourth planetary gear 72c engaged with the fourth sun gear 71c, a fourth ring gear 73c interengaged with the fourth planetary gear 72c and coupled to the third carrier 64, and a fourth carrier 74c rotatably supporting the fourth planetary gear 72c and the fourth carrier integrally coupled to the third ring gear 63 so as to be locked when the third brake 33 is actuated. A fourth brake 34c is similar installed between the third intermediate shaft 6c and the casing 30 and consequently, when the fourth brake 34 c is actuated, the third intermediate shaft 6c is locked relative thereto.

Concrete examples of the radial ratios within this embodiment are: $I_1 = 0.280$, $I_2 = 0.520$, $I_3 = 0.360$ and $I_4 = 0.562$. The gear ratios within the individual speed ranges, five forward speed ranges and three reverse speed ranges, in connection with the operations of clutches 21 and 22, and brakes 31, 32, 33 and 34c are tabulated below:

TABLE 3

| A | B | X1 | | | | | X2 | | |
|---|---|---|---|---|---|---|---|---|---|
| | | S1 | C1 | RG1 | P1 | S2 | C2 | RG2 | P2 |
| F1 | N | −1.59 | −0.51 | −0.20 | 0.84 | −1.59 | 0.11 | 1.00 | 3.69 |
| | W | 0.0 | 0.0 | 0.0 | 0.0 | 0.0 | 0.0 | 0.00 | 0.00 |
| F2 | N | −1.15 | −0.25 | 0.0 | 0.70 | −1.15 | 0.26 | 1.00 | 3.06 |
| | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
| | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
| | W | 0.0 | 0.0 | 0.0 | 0.0 | 1.00 | 2.00 | 1.00 | 1.00 |
| R1 | N | 1.00 | 0.32 | 0.13 | −0.53 | 1.00 | −0.07 | −0.63 | −2.32 |
| | W | 0.0 | 0.0 | 0.0 | 0.0 | 1.92 | 3.95 | 1.92 | 1.92 |
| R2 | N | 1.00 | 0.22 | 0.0 | −0.61 | 1.00 | −0.23 | −0.87 | −2.67 |
| | W | 0.0 | 0.0 | 0.0 | 0.0 | 1.92 | 3.85 | 1.92 | 1.92 |
| R3 | N | 1.00 | 0.00 | −0.28 | −0.78 | 1.00 | −0.57 | −1.39 | −3.41 |
| | W | 2.14 | 4.28 | 2.14 | 2.14 | 0.77 | 1.54 | 0.77 | 0.77 |

| A | B | X3 | | | | | X4 | | |
|---|---|---|---|---|---|---|---|---|---|
| | | S3 | C2 | RG3 | P3 | S4 | C4 | RG4 | P4 |
| F1 | N | 1.00 | 0.11 | −0.20 | −1.00 | −0.20 | −0.00 | 0.11 | 0.52 |
| | W | 2.78 | 5.56 | 2.78 | 2.78 | 4.94 | 9.89 | 4.94 | 4.94 |
| F2 | N | 1.00 | 0.26 | 0.0 | −0.83 | 0.0 | 0.17 | 0.26 | 0.43 |
| | W | 2.78 | 5.56 | 2.78 | 2.78 | 0.0 | 0.0 | 0.0 | 0.0 |
| F3 | N | 1.00 | 0.41 | 0.20 | −0.66 | 0.20 | 0.34 | 0.41 | 0.35 |
| | W | 1.11 | 2.23 | 1.11 | 1.11 | 0.0 | 0.0 | 0.0 | 0.0 |
| F4 | N | 1.00 | 0.66 | 0.53 | −0.38 | 0.53 | 0.61 | 0.66 | 0.20 |
| | W | 0.00 | 0.0 | 0.0 | 0.0 | 0.0 | 0.0 | 0.0 | 0.0 |
| R1 | N | −0.63 | −0.07 | 0.13 | 0.63 | 0.13 | 0.00 | −0.07 | −0.33 |
| | W | 5.34 | 10.68 | 5.34 | 5.34 | 9.51 | 19.01 | 9.51 | 9.51 |
| R2 | N | −0.87 | −0.23 | 0.0 | 0.72 | 0.0 | −0.15 | −0.23 | −0.38 |
| | W | 5.34 | 10.68 | 5.34 | 5.34 | 0.0 | 0.0 | 0.0 | 0.0 |
| R3 | N | −1.39 | −0.57 | −0.28 | 0.92 | −0.28 | −0.47 | −0.57 | −0.48 |
| | W | 2.14 | 4.28 | 2.14 | 2.14 | 0.0 | 0.0 | 0.0 | 0.0 |

| Speed Ranges | 21 | 22 | 31 | 32 | 33 | 34c | Gear Ratios |
|---|---|---|---|---|---|---|---|
| first speed | O | | | | O | | 1 : 3.78 |
| second speed | O | | | O | | | 1 : 2.43 |
| third speed | O | | | | | O | 1 : 2.00 |
| fourth speed | O | | O | | | | 1 : 1.52 |
| fifth speed | O | O | | | | | 1 : 1.00 |
| reverse 1st speed | | O | | | | O | 1 : −4.34 |
| reverse 2nd speed | | O | | | O | | 1 : −1.74 |
| reverse 3rd speed | | O | | | | O | 1 : −0.92 |

Table 4 shows the relationship between the number of revolutions and the tangential force of each of the elements of the planetary gear sets within each speed range.

Figure 5:
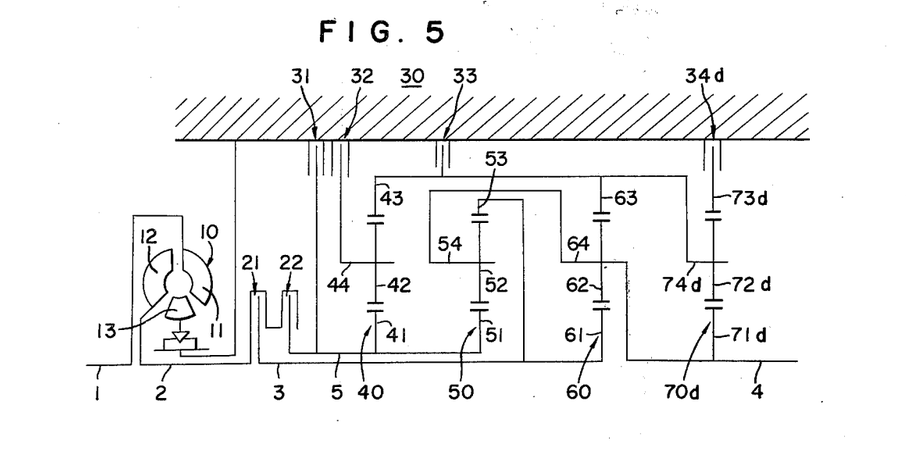
FIG. 5 is a view similar to that of FIG. 1 illustrating however a fifth embodiment of the present invention.

Reference now being made to FIG. 5, a fifth embodiment of the present invention is shown wherein the system is similar to that of the first embodiment and additionally includes a fourth sun gear 71d, of a fourth planetary gear set, generally indicated by the reference character 70d, of the single pinion type, secured upon the output shaft 4 whereby sun gear 71d can rotate therewith, and wherein further the fourth planetary gear set 70d also includes a fourth planetary gear 72d engaged with the fourth sun gear 71d, a fourth ring gear 73d enmeshed Table 5 shows the relationship regarding the number of revolutions and the tangential force of each of the elements of the planetary gear sets within each speed range.

Figure 6:
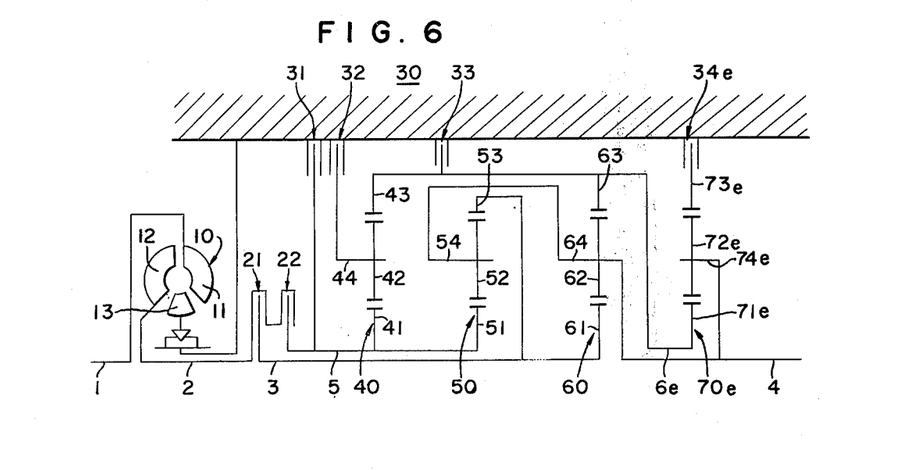
FIG. 6 is a view similar to that of FIG. 1 illustrating however a sixth embodiment of the present invention.

Referring now to FIG. 6, there is schematically shown a sixth embodiment of the present invention, which is also similar to the first embodiment, the present embodiment including a hollow third intermediate shaft 6e coaxially disposed upon the output shaft 4, and a fourth sun gear 71e, of a fourth planetary gear set, generally indicated by the reference character 70e, of the single pinion type, secured upon the third intermediate shaft 6e by spline means or the like whereby such

TABLE 4

| A | B | X1 | | | | X2 | | | |
|---|---|---|---|---|---|---|---|---|---|
|   |   | S1 | C1 | RG1 | P1 | S2 | C2 | RG2 | P2 |
| F1 | N | −1.15 | −0.25 | 0.0 | 0.70 | −1.15 | 0.26 | 1.00 | 3.06 |
|    | W | 0.0 | 0.0 | 0.0 | 0.0 | 0.0 | 0.0 | 0.00 | 0.00 |
| F2 | N | −0.72 | −0.00 | 0.20 | 0.56 | −0.72 | 0.41 | 1.00 | 2.45 |
|    | W | 1.11 | 2.23 | 1.11 | 1.11 | 0.60 | 1.20 | 0.60 | 0.60 |
| F3 | N | 0.0 | 0.42 | 0.53 | 0.32 | 0.0 | 0.66 | 1.00 | 1.43 |
|    | W | 0.0 | 0.0 | 0.0 | 0.0 | 1.00 | 2.00 | 1.00 | 1.00 |
| F4 | N | 0.36 | 0.63 | 0.70 | 0.21 | 0.36 | 0.78 | 1.00 | 0.91 |
|    | W | 0.0 | 0.0 | 0.0 | 0.0 | 0.0 | 0.00 | 0.00 | 0.00 |
| F6 | N | 1.00 | 1.74 | 1.95 | 0.58 | 1.00 | 2.17 | 2.77 | 2.53 |
|    | W | 0.0 | 0.0 | 0.0 | 0.0 | 1.92 | 3.85 | 1.92 | 1.92 |
| R1 | N | 1.00 | 0.22 | 0.0 | −0.61 | 1.00 | −0.23 | −0.87 | −2.67 |
|    | W | 0.0 | 0.0 | 0.0 | 0.0 | 1.92 | 3.85 | 1.92 | 1.92 |
| R2 | N | 1.00 | 0.00 | −0.28 | −0.78 | 1.00 | −0.57 | −1.39 | −3.41 |
|    | W | 2.14 | 4.28 | 2.14 | 2.14 | 0.77 | 1.54 | 0.77 | 0.77 |

| A | B | X3 | | | | X4 | | | |
|---|---|---|---|---|---|---|---|---|---|
|   |   | S3 | C2 | RG3 | P3 | S4 | C4 | RG4 | P4 |
| F1 | N | 1.00 | 0.26 | 0.0 | −0.83 | −2.36 | 0.26 | 1.00 | 2.04 |
|    | W | 2.78 | 5.56 | 2.78 | 2.78 | 0.0 | 0.00 | 0.00 | 0.00 |
| F2 | N | 1.00 | 0.41 | 0.20 | −0.66 | −1.69 | 0.41 | 1.00 | 1.63 |
|    | W | 1.11 | 2.23 | 1.11 | 1.11 | 0.0 | 0.00 | 0.00 | 0.00 |
| F3 | N | 1.00 | 0.66 | 0.53 | −0.38 | −0.56 | 0.66 | 1.00 | 0.95 |
|    | W | 0.00 | 0.0 | 0.0 | 0.0 | 0.0 | 0.00 | 0.00 | 0.00 |
| F4 | N | 1.00 | 0.78 | 0.70 | −0.25 | 0.0 | 0.78 | 1.00 | 0.61 |
|    | W | 0.00 | 0.0 | 0.0 | 0.0 | 1.00 | 2.00 | 1.00 | 1.00 |
| F6 | N | 2.77 | 2.17 | 1.95 | −0.68 | 0.0 | 2.17 | 2.77 | 1.69 |
|    | W | 0.0 | 0.0 | 0.0 | 0.0 | 1.92 | 3.85 | 1.92 | 1.92 |
| R1 | N | −0.87 | −0.23 | 0.0 | 0.72 | 2.05 | −0.23 | −0.87 | −1.78 |
|    | W | 5.34 | 10.68 | 5.34 | 5.34 | 0.0 | 0.00 | 0.00 | 0.00 |
| R2 | N | −1.39 | −0.57 | −0.28 | 0.92 | 2.35 | −0.57 | −1.39 | −2.27 |
|    | W | 2.14 | 4.28 | 2.14 | 2.14 | 0.0 | 0.00 | 0.00 | 0.00 | with the fourth planetary gear 72d, and a fourth carrier 74d rotatably supporting the fourth planetary gear 72d and being integrally coupled to the third ring gear 63 whereupon such carrier is locked relative to casing 30 when the third brake 33 is actuated. A fourth brake 34d is also provided in conjunction with the fourth ring gear 73d whereupon such brake being actuated, the fourth ring gear 73d will be locked relative to casing 30.

Concrete examples of the radial ratios in this embodiment are: $I_1 = 0.280$, $I_2 = 0.520$, $I_3 = 0.360$ and $I_4 = 0.562$ and the following table summarizes the gear ratios within the individual speed ranges, five forward speed ranges and three reverse speed ranges in connection with the operations of clutches 21 and 22 and brakes 31, 32, 33 and 34d:

sun gear is permitted to rotate with the third intermediate shaft 6e. The fourth planetary gear set 70e is further provided with a fourth planetary gear 72e engaged with the fourth sun gear 71e, a fourth ring gear 73e interengaged with the fourth planetary gear 72e, and a fourth carrier 74e rotatably supporting the fourth planetary gear 72e and being integrally coupled to the output shaft 4. The third intermediate shaft 6e is integrally coupled to the third ring gear 63 whereby the intermediate shaft 6e is able to be locked relative to casing 30 when the third brake 33 is actuated. A fourth brake 34e is similarly provided between the fourth ring gear 73e and the casing 30 and when this brake 34e is actuated, the fourth ring gear 73e is also locked relative to casing 30.

| Speed Ranges | 21 | 22 | 31 | 32 | 33 | 34d | Gear Ratios |
|---|---|---|---|---|---|---|---|
| first speed | O |   |   |   |   | O | 1 : 3.78 |
| second speed | O |   |   |   |   | O | 1 : 2.78 |
| third speed | O |   |   |   | O |   | 1 : 2.43 |
| fourth speed | O |   |   | O |   |   | 1 : 1.52 |
| fifth speed | O | O |   |   |   |   | 1 : 1.00 |
| reverse 1st speed |   | O |   |   |   | O | 1 : −4.34 |
| reverse 2nd speed |   | O |   |   |   | O | 1 : −2.42 |
| reverse 3rd speed |   | O |   |   | O |   | 1 : −1.74 |

TABLE 5

| A | B | X1 | | | | X2 | | | |
|---|---|---|---|---|---|---|---|---|---|
| | | S1 | C1 | RG1 | P1 | S2 | C2 | RG2 | P2 |
| F1 | N | −1.15 | −0.25 | 0.0 | 0.70 | −1.15 | 0.26 | 1.00 | 3.06 |
| | W | 0.0 | 0.0 | 0.0 | 0.0 | 0.0 | 0.00 | 0.00 | 0.00 |
| F2 | N | −0.87 | −0.09 | 0.13 | 0.61 | −0.87 | 0.36 | 1.00 | 2.67 |
| | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
| | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
| | W | 0.0 | 0.0 | 0.0 | 0.0 | 1.00 | 2.00 | 1.00 | 1.00 |
| R1 | N | 1.00 | 0.22 | 0.0 | −0.61 | 1.00 | −0.23 | −0.87 | −2.67 |
| | W | 0.0 | 0.0 | 0.0 | 0.0 | 1.92 | 3.85 | 1.92 | 1.92 |
| R2 | N | 1.00 | 0.10 | −0.15 | −0.70 | 1.00 | −0.41 | −1.15 | −3.06 |
| | W | 0.0 | 0.0 | 0.0 | 0.0 | 1.92 | 3.85 | 1.92 | 1.92 |
| R3 | N | 1.00 | 0.00 | −0.28 | −0.78 | 1.00 | −0.57 | −1.39 | −3.41 |
| | W | 2.14 | 4.28 | 2.14 | 2.14 | 0.77 | 1.54 | 0.77 | 0.77 |

| A | B | X3 | | | | X4 | | | |
|---|---|---|---|---|---|---|---|---|---|
| | | S3 | C2 | RG3 | P3 | S4 | C4 | RG4 | P4 |
| F1 | N | 1.00 | 0.26 | 0.0 | −0.83 | 0.26 | 0.00 | −0.15 | −0.68 |
| | W | 2.78 | 5.56 | 2.78 | 2.78 | 0.0 | 0.0 | 0.0 | 0.0 |
| F2 | N | 1.00 | 0.36 | 0.13 | −0.72 | 0.36 | 0.13 | 0.0 | −0.59 |
| | W | 2.78 | 5.56 | 2.78 | 2.78 | 1.78 | 3.56 | 1.78 | 1.78 |
| F3 | N | 1.00 | 0.41 | 0.20 | −0.66 | 0.41 | 0.20 | 0.08 | −0.54 |
| | W | 1.11 | 2.23 | 1.11 | 1.11 | 0.0 | 0.0 | 0.0 | 0.0 |
| F4 | N | 1.00 | 0.66 | 0.53 | −0.38 | 0.66 | 0.53 | 0.47 | −0.32 |
| | W | 0.00 | 0.0 | 0.0 | 0.0 | 0.0 | 0.0 | 0.0 | 0.0 |
| R1 | N | −0.87 | −0.23 | 0.0 | 0.72 | −0.23 | −0.00 | 0.13 | 0.59 |
| | W | 5.34 | 10.68 | 5.34 | 5.34 | 0.0 | 0.0 | 0.0 | 0.0 |
| R2 | N | −1.15 | −0.41 | −0.15 | 0.83 | −0.41 | −0.15 | 0.0 | 0.68 |
| | W | 5.34 | 10.68 | 5.34 | 5.34 | 3.42 | 6.84 | 3.42 | 3.42 |
| R3 | N | −1.39 | −0.57 | −0.23 | 0.92 | −0.57 | −0.28 | −0.11 | 0.76 |
| | W | 2.14 | 4.28 | 2.14 | 2.14 | 0.0 | 0.0 | 0.0 | 0.0 |

The radial ratios within this embodiment are: $I_1 = 0.280$, $I_2 = 0.520$, $I_3 = 0.360$ and $I_4 = 0.437$, and tabulated below are the gear ratios within the individual speed ranges, five forward speed ranges and three reverse speed ranges, in connection with the operations of clutches 21 and 22 and brakes 31, 32, 33 and 34e: of revolutions and the tangential force of each of the elements of the planetary gear sets within each speed range.

Figure 7:
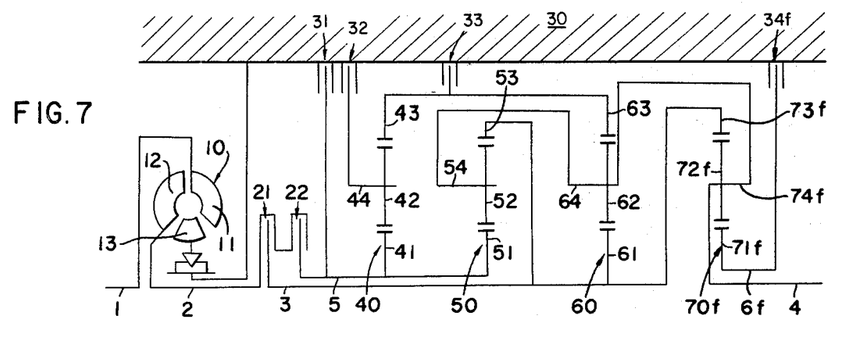
FIG. 7 is a view similar to that of FIG. 1 illustrating however a seventh embodiment of the present invention.

Turning now to FIG. 7, there is schematically shown a seventh embodiment of the present invention which is seen to be similar to the first embodiment and also includes a hollow third intermediate shaft

| Speed Ranges | 21 | 22 | 31 | 32 | 33 | 34e | Gear Ratios |
|---|---|---|---|---|---|---|---|
| first speed | | | | | | O | 1 : 13.22 |
| second speed | O | | | | O | | 1 : 3.78 |
| third speed | O | | | O | | | 1 : 2.43 |
| fourth speed | O | | O | | | | 1 : 1.52 |
| fifth speed | O | O | | | | | 1 : 1.00 |
| reverse 1st speed | O | | | | | O | 1 : −5.36 |
| reverse 2nd speed | | O | | | O | | 1 : −4.34 |
| reverse 3rd speed | | O | O | | | | 1 : −1.74 |

Table 6 shows the relationship between the number

TABLE 6

| A | B | X1 | | | | X2 | | | |
|---|---|---|---|---|---|---|---|---|---|
| | | S1 | C1 | RG1 | P1 | S2 | C2 | RG2 | P2 |
| F1 | N | 1.00 | 0.41 | 0.25 | −0.46 | 1.00 | 0.08 | −0.41 | −2.00 |
| | W | 0.0 | 0.0 | 0.0 | 0.0 | 1.92 | 3.85 | 1.92 | 1.92 |
| F2 | N | −1.15 | −0.25 | 0.0 | 0.70 | −1.15 | 0.26 | 1.00 | 3.06 |
| | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
| | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
| | W | 0.0 | 0.0 | 0.0 | 0.0 | 1.00 | 2.00 | 1.00 | 1.00 |
| R1 | N | −2.47 | −1.02 | −0.61 | 1.13 | −2.47 | −0.19 | 1.00 | 4.94 |
| | W | 0.0 | 0.0 | 0.0 | 0.0 | 0.0 | 0.0 | 0.0 | 0.0 |
| R2 | N | 1.00 | 0.22 | 0.0 | −0.61 | 1.00 | −0.23 | −0.87 | −2.67 |
| | W | 0.0 | 0.0 | 0.0 | 0.0 | 1.92 | 3. | 1.92 | 1.92 |
| R3 | N | 1.00 | 0.00 | −0.28 | −0.78 | 1.00 | −0.57 | −1.39 | −3.41 |
| | W | 2.14 | 4.28 | 2.14 | 2.14 | 0.77 | 1.54 | 0.77 | 0.77 |

| A | B | X3 | | | | X4 | | | |
|---|---|---|---|---|---|---|---|---|---|
| | | S3 | C2 | RG3 | P3 | S4 | C4 | RG4 | P4 |
| F1 | N | −0.41 | 0.08 | 0.25 | 0.54 | 0.25 | 0.08 | 0.0 | −0.27 |
| | W | 5.34 | 10.68 | 5.34 | 5.34 | 12.22 | 24.45 | 12.22 | 12.22 |
| F2 | N | 1.00 | 0.26 | 0.0 | −0.83 | 0.0 | 0.26 | 0.38 | 0.41 |
| | W | 2.78 | 5.56 | 2.78 | 2.78 | 0.0 | 0.0 | 0.0 | 0.0 |
| F3 | N | 1.00 | 0.41 | 0.20 | −0.66 | 0.20 | 0.41 | 0.50 | 0.33 |
| | W | 1.11 | 2.23 | 1.11 | 1.11 | 0.0 | 0.0 | 0.0 | 0.0 |
| | N | 1.00 | 0.66 | 0.53 | −0.38 | 0.53 | 0.66 | 0.71 | 0.19 |

TABLE 6-continued

| A | B | X1 | | | | X2 | | | |
|---|---|---|---|---|---|---|---|---|---|
| | | S1 | C1 | RG1 | P1 | S2 | C2 | RG2 | P2 |
| F4 | W | 0.00 | 0.0 | 0.0 | 0.0 | 0.0 | 0.0 | 0.0 | 0.0 |
| | N | 1.00 | −0.19 | −0.61 | −1.34 | −0.61 | −0.19 | 0.0 | 0.66 |
| R1 | W | 2.78 | 5.56 | 2.78 | 2.78 | 6.36 | 12.71 | 6.36 | 6.36 |
| | N | −0.87 | −0.23 | 0.0 | 0.72 | 0.0 | −0.23 | −0.33 | −0.36 |
| R2 | W | 5.34 | 10.68 | 5.34 | 5.34 | 0.0 | 0.0 | 0.0 | 0.0 |
| | N | −1.39 | −0.57 | −0.28 | 0.92 | −0.28 | −0.57 | −0.70 | −0.46 |
| R3 | W | 2.14 | 4.28 | 2.14 | 2.14 | 0.0 | 0.0 | 0.0 | 0.0 |

6f disposed coaxially upon the output shaft 4 and a fourth sun gear 71f of a fourth planetary gear set, generally indicated by the reference character 70f, of the single pinion type, secured upon the third intermediate shaft 6f so as to rotate therewith. The fourth planetary gear set 70f comprises the fourth sun gear 71f, a fourth planetary gear 72f engaged with the fourth sun gear 71f, a fourth ring gear 73f enmeshed with the fourth planetary gear 72f and drivingly coupled to the first intermediate shaft 3, and a fourth carrier 74f rotatably supporting the fourth planetary gear 72f. A fourth brake 34f is interposed between the third intermediate shaft 6f and the casing 30 such that when this brake is actuated, the third intermediate shaft 6f is locked relative to casing 30, and the fourth carrier 74f is integrally coupled to the third carrier 64 as well as to the output shaft 4.

The radial ratios within this embodiment are: $I_1 = 0.280$, $I_2 = 0.520$, $I_3 = 0.360$ and $I_4 = 0.280$ and tabulated below are the gear ratios within the individual speed ranges, six forward speed ranges and two reverse speed ranges in connection with the operations of clutches 21 and 22 and brakes 31, 32, 33 and 34f:

| Speed Ranges | 21 | 22 | 31 | 32 | 33 | 34f | Gear Ratios |
|---|---|---|---|---|---|---|---|
| first speed | O | | | | | O | 1 : 3.78 |
| second speed | O | | | | O | | 1 : 2.43 |
| third speed | O | | | O | | | 1 : 1.52 |
| fourth speed | O | | | | | O | 1 : 1.28 |
| fifth speed | O | O | | | | | 1 : 1.00 |
| sixth speed | | O | | | | O | 1 : 0.46 |
| reverse 1st speed | | O | | | O | | 1 : −4.34 |
| reverse 2nd speed | | O | | O | | | 1 : −1.74 |

Table 7 shows the relationship between the number of revolutions and the tangential force of each of the elements of the planetary gear sets within each speed range.

Figure 8:
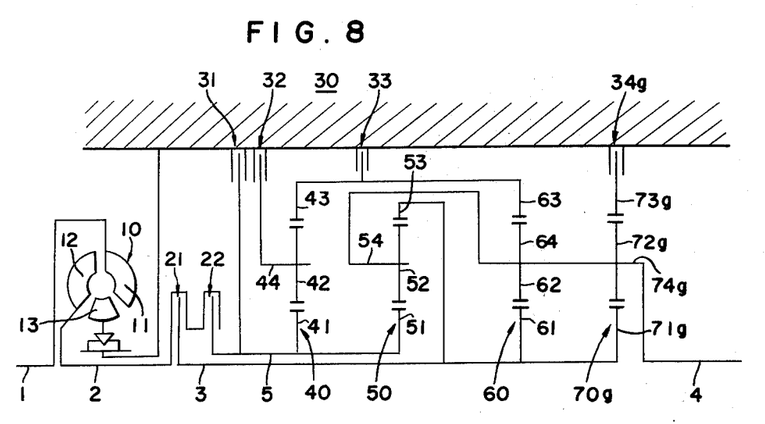
FIG. 8 is a view similar to that of FIG. 1 illustrating however an eighth embodiment of the present invention.

Referring now to FIG. 8, there is schematically shown an eighth embodiment of the present invention which is similar to the first embodiment and further includes a fourth sun gear 71g, of a fourth planetary gear set, generally indicated by the reference character 70g, of the single pinion type, fastened upon the first intermediate shaft 3 at the rear end thereof and to the rear of the third planetary gear set 60 by spline means or the like so that sun gear 71g is able to rotate with the first intermediate shaft 3. The fourth planetary gear set 70g includes

TABLE 7

| A | B | X1 | | | | X2 | | | |
|---|---|---|---|---|---|---|---|---|---|
| | | S1 | C1 | RG1 | P1 | S2 | C2 | RG2 | P2 |
| F1 | N | 1.00 | 0.52 | 3.39 | −0.37 | 1.00 | 0.25 | −0.14 | −1.63 |
| | W | 0.0 | 0.0 | 0.0 | 0.0 | 1.92 | 3.85 | 1.92 | 1.92 |
| F2 | N | −1.15 | −0.25 | 0.0 | 0.70 | −1.15 | 0.26 | 1.00 | 3.06 |
| | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
| | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
| | W | 0.0 | 0.0 | 0.0 | 0.0 | 1.00 | 2.00 | 1.00 | 1.00 |
| R1 | N | 1.00 | 0.22 | 0.0 | −0.61 | 1.00 | −0.23 | −0.87 | −2.67 |
| | W | 0.0 | 0.0 | 0.0 | 0.0 | 1.92 | 3.85 | 1.92 | 1.92 |
| R2 | N | 1.00 | 0.00 | −0.28 | −0.78 | 1.00 | −0.57 | −1.39 | −3.41 |
| | W | 2.14 | 4.28 | 2.14 | 2.14 | 0.77 | 1.54 | 0.77 | 0.77 |

| A | B | X3 | | | | X4 | | | |
|---|---|---|---|---|---|---|---|---|---|
| | | S3 | C2 | RG3 | P3 | S4 | C4 | RG4 | P4 |
| F1 | N | −0.14 | 0.25 | 0.39 | 0.44 | 0.0 | 0.25 | 0.39 | 0.64 |
| | W | 5.34 | 10.68 | 5.34 | 5.34 | 5.34 | 10.68 | 5.34 | 5.34 |
| F2 | N | 1.00 | 0.26 | 0.0 | −0.83 | 0.74 | 0.26 | 0.0 | −1.21 |
| | W | 2.78 | 5.56 | 2.78 | 2.78 | 0.0 | 0.0 | 0.0 | 0.0 |
| F3 | N | 1.00 | 0.41 | 0.20 | −0.66 | 0.79 | 0.41 | 0.20 | −0.97 |
| | W | 1.11 | 2.23 | 1.11 | 1.11 | 0.0 | 0.0 | 0.0 | 0.0 |
| F4 | N | 1.00 | 0.66 | 0.53 | −0.38 | 0.88 | 0.66 | 0.53 | −0.56 |
| | W | 0.00 | 0.0 | 0.0 | 0.0 | 0.0 | 0.0 | 0.0 | 0.0 |
| R1 | N | −0.87 | −3.23 | 0.0 | 3.72 | −0.64 | −0.23 | 0.0 | 1.05 |
| | W | 5.34 | 10.68 | 5.34 | 5.34 | 0.0 | 0.0 | 0.0 | 0.0 |
| R2 | N | −1.39 | −0.57 | −0.28 | 0.92 | −1.10 | −0.57 | −0.28 | 1.35 |
| | W | 2.14 | 4.28 | 2.14 | 2.14 | 0.0 | 0.0 | 0.0 | 0.0 | the fourth sun gear 71g, a fourth planetary gear 72g engaged with the fourth sun gear 71g, a fourth ring gear 73g interengaged with the fourth planetary gear 72g, and a fourth carrier 74g rotatably supporting the fourth planetary gear 72g and integrally coupled to the third carrier 64, as well as to the output shaft 4. A fourth brake 34g is installed between the fourth ring gear 73g and the casing 30 such that when brake 34g is actuated, the fourth ring gear 73g is locked relative to casing 30.

The radial ratios within the speed ranges within this embodiment are: $I_1 = 0.280$, $I_2 = 0.520$, $I_3 = 0.360$ and $I_4 = 0.280$, and tabulated below are the gear ratios within the individual speed ranges, five forward speed ranges and three reverse speed ranges, in connection with the operations of clutches 21 and 22 and brakes 31, 32, 33 and 34g:

| Speed Ranges | 21 | 22 | 31 | 32 | 33 | 34g | Gear Ratios |
|---|---|---|---|---|---|---|---|
| first speed | O | | | | | O | 1 : 4.57 |
| second speed | O | | | | O | | 1 : 3.78 |
| third speed | O | | | O | | | 1 : 2.43 |
| fourth speed | O | | O | | | | 1 : 1.52 |
| fifth speed | O | O | | | | | 1 : 1.00 |
| reverse 1st speed | | O | | | | O | 1 : −5.87 |
| reverse 2nd speed | | O | | | O | | 1 : −4.34 |
| reverse 3rd speed | | O | O | | | | 1 : −1.74 |

Figure 9:
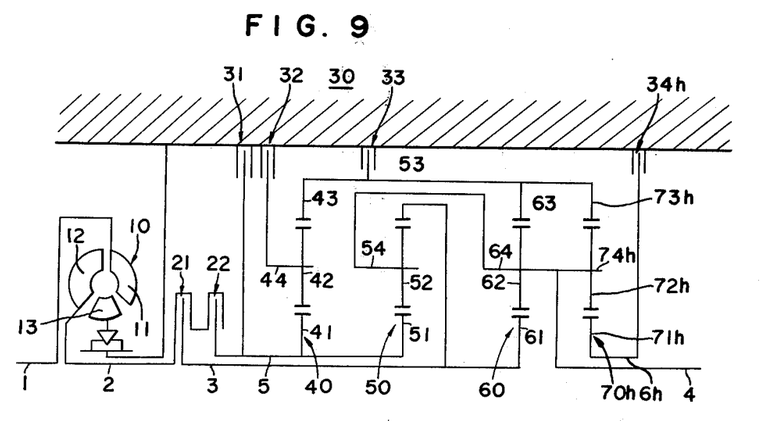
FIG. 9 is a view similar to that of FIG. 1 illustrating however a ninth embodiment of the present invention.

Table 8 shows the relationship between the number of revolutions and the tangential force of each of the elements of the planetary gear sets within each speed range.

being fastened upon the third intermediate shaft 6h by spline means or the like whereby sun gear 71h can rotate with the third intermediate shaft 6f. The fourth planetary gear set 70h includes the fourth sun gear 71h, a fourth planetary gear 72h engaged with the fourth sun gear 71h, a fourth ring gear 73h engaged with the fourth planetary gear 72h and integrally coupled to the third ring gear 63, and a fourth carrier 74h rotatably supporting the fourth planetary gear 72h and coupled to the third carrier 64. The ring gear 73h is of course locked relative to casing 30 when the third brake 33 is actuated, and a fourth brake 34h is similarly installed between the fourth sun gear 71h and the casing 30 whereupon this brake being actuated, the fourth sun gear 71h will be locked relative to casing 30.

TABLE 8

| A | B | X1 | | | | X2 | | | |
|---|---|---|---|---|---|---|---|---|---|
| | | S1 | C1 | RG1 | P1 | S2 | C2 | RG2 | P2 |
| F1 | N | −1.15 | −0.25 | 0.0 | 0.70 | −1.15 | 0.26 | 1.00 | 3.06 |
| | W | 0.0 | 0.0 | 0.0 | 0.0 | 0.0 | 0.00 | 0.00 | 0.00 |
| F2 | N | −0.72 | −0.00 | 0.20 | 0.56 | −0.72 | 0.41 | 1.00 | 2.45 |
| | W | 1.11 | 2.23 | 1.11 | 1.11 | 0.60 | 1.20 | 0.60 | 0.60 |
| F3 | N | −0.46 | 0.15 | 0.32 | 0.47 | −0.46 | 0.50 | 1.00 | 2.08 |
| | W | 0.0 | 0.0 | 0.0 | 0.0 | 0.0 | 0.00 | 0.0 | 0.0 |
| F4 | N | 0.0 | 0.42 | 0.53 | 0.32 | 0.0 | 0.66 | 1.00 | 1.43 |
| | W | 0.0 | 0.0 | 0.0 | 0.0 | 1.00 | 2.00 | 1.00 | 1.00 |
| R1 | N | 1.00 | 0.22 | 0.0 | −0.61 | 1.00 | −0.23 | −0.87 | −2.67 |
| | W | 0.0 | 0.0 | 0.0 | 0.0 | 1.92 | 3.85 | 1.92 | 1.92 |
| R2 | N | 1.00 | 0.00 | −0.28 | −0.78 | 1.00 | −0.57 | −1.39 | −3.41 |
| | W | 2.14 | 4.28 | 2.14 | 2.14 | 0.77 | 1.54 | 0.77 | 0.77 |
| R3 | N | 1.00 | −0.32 | −0.69 | −1.03 | 1.00 | −1.08 | −2.17 | −4.52 |
| | W | 0.0 | 0.0 | 0.0 | 0.0 | 1.92 | 3.85 | 1.92 | 1.92 |

| A | B | X3 | | | | X4 | | | |
|---|---|---|---|---|---|---|---|---|---|
| | | S3 | C2 | RG3 | P3 | S4 | C4 | RG4 | P4 |
| F1 | N | 1.00 | 0.26 | 0.0 | −0.83 | −0.47 | 0.0 | 0.26 | 1.21 |
| | W | 2.78 | 5.56 | 2.78 | 2.78 | 0.0 | 0.0 | 0.0 | 0.0 |
| F2 | N | 1.00 | 0.41 | 0.28 | −0.66 | −0.18 | 0.20 | 0.41 | 0.97 |
| | W | 1.11 | 2.23 | 1.11 | 1.11 | 0.0 | 0.0 | 0.0 | 0.0 |
| F3 | N | 1.00 | 0.50 | 0.32 | −0.56 | 0.0 | 0.32 | 0.50 | 0.82 |
| | W | 2.78 | 5.56 | 2.78 | 2.78 | 1.78 | 3.56 | 1.78 | 1.78 |
| F4 | N | 1.00 | 0.66 | 0.53 | −0.38 | 0.32 | 0.53 | 0.66 | 0.56 |
| | W | 0.00 | 0.0 | 0.0 | 0.0 | 0.0 | 0.0 | 0.0 | 0.0 |
| R1 | N | −0.87 | −0.23 | 0.0 | 0.72 | 0.41 | 0.0 | −0.23 | −1.05 |
| | W | 5.34 | 10.68 | 5.34 | 5.34 | 0.0 | 0.0 | 0.0 | 0.0 |
| R2 | N | −1.39 | −0.57 | −0.28 | 0.92 | 0.24 | −0.28 | −0.57 | −1.35 |
| | W | 2.14 | 4.28 | 2.14 | 2.14 | 0.0 | 0.0 | 0.0 | 0.0 |
| R3 | N | −2.17 | −1.08 | −0.69 | 1.22 | 0.0 | −0.69 | −1.08 | −1.78 |
| | W | 5.34 | 10.68 | 5.34 | 5.34 | 3.42 | 6.84 | 3.42 | 3.42 |

Reference now being made to FIG. 9, there is schematically shown a ninth embodiment of the present invention, which is also similar to the first embodiment, the ninth embodiment being further provided with a hollow third intermediate shaft 6g coaxially disposed upon the output shaft 4, and a fourth sun gear 71h, of a fourth planetary gear set, generally indicated by the reference character 70h, of the single pinion type, Concrete examples of the radial ratios within the speed ranges within this embodiment are: $I_1 = 0.280$, $I_2 = 0.520$, $I_3 = 0.360$ and $I_4 = 0.562$ and tabulated below are the gear ratios within the individual speed ranges, five forward speed ranges and two reverse speed ranges, in connection with the operations of clutches 21 and 22 and brakes 31, 32, 33 and 34h:

| Speed Ranges | 21 | 22 | 31 | 32 | 33 | 34h | Gear Ratios |
|---|---|---|---|---|---|---|---|
| first speed | | O | | | | O | 1 : 4.00 |
| second speed | O | | | | O | | 1 : 3.78 |
| third speed | O | | | O | | | 1 : 2.43 |
| fourth speed | O | | O | | | | 1 : 1.52 |
| fifth speed | O | O | | | | | 1 : 1.00 |

| Speed Ranges | 21 | 22 | 31 | 32 | 33 | 34h | -continued Gear Ratios |
|---|---|---|---|---|---|---|---|
| reverse 1st speed | O | | | O | | | 1 : −4.34 |
| reverse 2nd speed | O | | O | | | | 1 : −1.74 |

Table 9 shows the relationship between the number of revolutions and the tangential force of each of the elements of the planetary gear sets within each speed range.

Thus, it may be seen that according to the present invention, as has been described above, a speed change gear system capable of changing between at least four forward speeds and one reverse speed can readily be realized and which will no doubt contribute greatly to the development of the motor vehicle industry.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A speed change gear comprising:
   an input shaft;
   a first clutch for coupling or uncoupling a second ring gear and a third sun gear simultaneously to or from said input shaft;
   a second clutch for coupling or uncoupling a first sun gear and a second sun gear simultaneously to or from said input shaft;
   a first planetary gear engaged with said first sun gear;
   a first ring gear engaged with said first planetary gear;
   a first carrier rotatably supporting said first planetary gear;
   a second planetary gear engaged with said second sun gear;
   a second carrier rotatably supporting said second planetary gear;
   a third planetary gear engaged with said third sun gear;
   a third ring gear engaged with said third planetary gear and coupled to said first ring gear;
   a third carrier rotatably supporting said third planetary gear and coupled to said second carrier and to an output shaft;
   a second brake capable of being actuated for locking said first carrier to a casing; and
   a third brake capable of being actuated for locking said first ring gear and said third ring gear simultaneously to said casing.

TABLE 9

| A | B | X1 S1 | C1 | RG1 | P1 | S2 | X2 C2 | RG2 | P2 |
|---|---|---|---|---|---|---|---|---|---|
| F1 | N | −1.28 | −0.33 | −0.06 | 0.74 | −1.28 | 0.22 | 1.00 | 3.26 |
|    | W | 0.0 | 0.0 | 0.0 | 0.0 | 0.0 | 0.00 | 0.00 | 0.00 |
| F2 | N | −1.15 | −0.25 | 0.0 | 0.70 | −1.15 | 0.26 | 1.00 | 3.06 |
|    | W | 0.0 | 0.0 | 0.0 | 0.0 | 0.0 | 0.00 | 0.00 | 0.00 |
| F3 | N | −0.72 | −0.00 | 0.20 | 0.56 | −0.72 | 0.41 | 1.00 | 2.45 |
|    | W | 1.11 | 2.23 | 1.11 | 1.11 | 0.60 | 1.20 | 0.60 | 0.60 |
| F4 | N | 0.0 | 0.42 | 0.53 | 0.32 | 0.0 | 0.66 | 1.00 | 1.43 |
|    | W | 0.0 | 0.0 | 0.0 | 0.0 | 1.00 | 2.00 | 1.00 | 1.00 |
| R1 | N | 1.00 | 0.26 | 0.05 | −0.58 | 1.00 | −0.17 | −0.78 | −2.54 |
|    | W | 0.0 | 0.0 | 0.0 | 0.0 | 1.92 | 3.85 | 1.92 | 1.92 |
| R2 | N | 1.00 | 0.22 | 0.0 | −0.61 | 1.00 | −0.23 | −0.87 | −2.67 |
|    | W | 0.0 | 0.0 | 0.0 | 0.0 | 1.92 | 3.85 | 1.92 | 1.92 |
| R3 | N | 1.00 | 0.00 | −0.28 | −0.78 | 1.00 | −0.57 | −1.39 | −3.41 |
|    | W | 2.14 | 4.28 | 2.14 | 2.14 | 0.77 | 1.54 | 0.77 | 0.77 |

| A | B | X3 S3 | C2 | RG3 | P3 | S4 | X4 C4 | RG4 | P4 |
|---|---|---|---|---|---|---|---|---|---|
| F1 | N | 1.00 | 0.22 | −0.06 | −0.88 | 1.00 | 0.22 | 0.0 | −0.61 |
|    | W | 0.0 | 0.0 | 0.0 | 0.0 | 3.57 | 7.14 | 3.57 | 3.57 |
| F2 | N | 1.00 | 0.26 | 0.0 | −0.83 | 1.00 | 0.26 | 0.06 | −0.57 |
|    | W | 2.78 | 5.56 | 2.78 | 2.78 | 0.0 | 0.0 | 0.0 | 0.0 |
| F3 | N | 1.00 | 0.41 | 0.20 | −0.66 | 1.00 | 0.41 | 0.25 | −0.46 |
|    | W | 1.11 | 2.23 | 1.11 | 1.11 | 0.00 | 0.0 | 0.0 | 0.0 |
| F4 | N | 1.00 | 0.66 | 0.53 | −0.38 | 1.00 | 0.66 | 0.56 | −0.27 |
|    | W | 0.0 | 0.0 | 0.0 | 0.0 | 0.00 | 0.0 | 0.0 | 0.0 |
| R1 | N | −0.78 | −0.17 | 0.05 | 0.68 | −0.78 | −0.17 | 0.0 | 0.47 |
|    | W | 0.0 | 0.0 | 0.0 | 0.0 | 6.87 | 13.74 | 6.87 | 6.87 |
| R2 | N | −0.87 | −0.23 | 0.0 | 0.72 | −0.87 | −0.23 | −0.05 | 0.50 |
|    | W | 5.34 | 10.68 | 5.34 | 5.34 | 0.0 | 0.0 | 0.0 | 0.0 |
| R3 | N | −1.39 | −0.57 | −0.28 | 0.92 | −1.39 | −0.57 | −0.35 | 0.64 |
|    | W | 2.14 | 4.28 | 2.14 | 2.14 | 0.0 | 0.0 | 0.0 | 0.0 |

* * * * *